United States Patent
Zhang

(10) Patent No.: US 11,040,916 B2
(45) Date of Patent: Jun. 22, 2021

(54) WATERPROOFING AGENT FOR CONCRETE

(71) Applicant: Yuwen Zhang, Qingdao (CN)

(72) Inventor: Yuwen Zhang, Qingdao (CN)

(*) Notice: Subject to any disclaimer, the term of this patent is extended or adjusted under 35 U.S.C. 154(b) by 0 days.

(21) Appl. No.: 16/830,228

(22) Filed: Mar. 25, 2020

(65) Prior Publication Data

US 2020/0223759 A1    Jul. 16, 2020

Related U.S. Application Data

(63) Continuation-in-part of application No. PCT/CN2018/121945, filed on Dec. 19, 2018.

(30) Foreign Application Priority Data

Jun. 4, 2018  (CN) .......................... 201810567436.7

(51) Int. Cl.
```
C04B 40/00      (2006.01)
C04B 22/04      (2006.01)
C04B 22/14      (2006.01)
C04B 24/04      (2006.01)
C04B 24/12      (2006.01)
C04B 103/00     (2006.01)
C04B 103/65     (2006.01)
```

(52) U.S. Cl.
CPC .......... *C04B 40/0039* (2013.01); *C04B 22/04* (2013.01); *C04B 22/142* (2013.01); *C04B 24/04* (2013.01); *C04B 24/128* (2013.01); *C04B 2103/0014* (2013.01); *C04B 2103/65* (2013.01)

(58) Field of Classification Search
CPC ..... C04B 22/04; C04B 22/142; C04B 22/147; C04B 22/149; C04B 22/16; C04B 24/04; C04B 24/128; C04B 28/02; C04B 40/0039; C04B 2103/0014; C04B 2103/65

See application file for complete search history.

(56) References Cited

FOREIGN PATENT DOCUMENTS

CN           103880319 A    *  6/2014

OTHER PUBLICATIONS

PCT/CN2018/121945 (WO 2019/086052) International Search Report. (Year: 2019).*
PCT/CN2018/121945 (WO 2019/086052) Written Opinion (Year: 2019).*

* cited by examiner

*Primary Examiner* — Anthony J Green
(74) *Attorney, Agent, or Firm* — Matthias Scholl P.C.; Matthias Scholl

(57) ABSTRACT

A waterproofing agent for concrete includes: 1-60 parts by weight of ferric ions; 1-60 parts by weight of carboxylate ions; 1-40 parts by weight of 8-hydroxyquinoline; and 1-50 parts by weight of pyrosulfate ions.

6 Claims, No Drawings

WATERPROOFING AGENT FOR CONCRETE

CROSS-REFERENCE TO RELATED APPLICATIONS

This application is a continuation-in-part of International Patent Application No. PCT/CN2018/121945 with an international filing date of Dec. 19, 2018, designating the United States, now pending, and further claims priority benefits to Chinese Patent Application No. 201810567436.7 filed Jun. 4, 2018. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to a waterproofing agent for concrete.

The concrete includes micro-cracks, which leads to leakage and infiltrations of harmful substances. Conventionally, ferric chloride as an anticorrosive waterproofing agent is mixed with water to yield ferric hydroxide colloids to fill the micro-cracks. However, the production of the ferric hydroxide colloids is asynchronous with the formations of the concrete, so that the ferric chloride is not an ideal waterproofing agent.

SUMMARY

The disclosure provides a waterproofing agent for concrete

The waterproofing agent for concrete comprises: 1-60 parts by weight of ferric ions; 1-60 parts by weight of carboxylate ions; 1-40 parts by weight of 8-hydroxyquinoline; and 1-50 parts by weight of pyrosulfate ions.

The ferric ions are provided by ferric chloride, ammonium ferric sulfate, ferric sulfate, polyferric sulfate, ferric nitrate, or a mixture thereof.

The carboxylate ions are provided by glacial acetic acid, sodium acetate, potassium acetate, sodium formate, or a mixture thereof.

The 8-hydroxyquinoline comprises methyl 8-hydroxyquinoline.

The pyrosulfate ions are provided by sodium pyrosulfate, potassium pyrosulfate, ammonium pyrosulfate, or a mixture thereof.

Specifically, the compositions of matter comprise: 1-60 parts by weight of ammonium ferric sulfate; 1-30 parts by weight of glacial acetic acid; 1-40 parts by weight of 8-hydroxyquinoline; and 1-50 parts by weight of sodium pyrosulfate.

Ferric ions (trivalent) are combined with three ligands comprising glacial acetic acid, 8-hydroxyquinoline, and sodium pyrosulfate to form a complex compound. The changes of the pH value and concentrations of cement aqueous solutions of concrete are recorded as indicating parameters to start of the complex reactions process to form $Fe(OH)_3$ colloids. That is, the $Fe(OH)_3$ colloids are not produced immediately after water is added to the cement, when the concentrations of aqueous solutions of the cement in concrete increases by about 2-3 times, the complex reactions process is initiated to form $Fe(OH)_3$ colloids.

DETAILED DESCRIPTIONS OF THE EMBODIMENTS

To further illustrate, embodiments detailing a waterproofing agent for concrete are described below. It should be noted that the following embodiments are intended to describe and not to limit the disclosure.

The disclosure provides a waterproofing agent for concrete comprising 1-60 parts by weight of ferric ions; 1-60 parts by weight of carboxylate ions; 1-40 parts by weight of 8-hydroxyquinoline; and 1-50 parts by weight of pyrosulfate ions.

The ferric ions are provided by ferric chloride, ammonium ferric sulfate, ferric sulfate, polyferric sulfate, ferric nitrate, or a mixture thereof.

The carboxylate ions are provided by glacial acetic acid, sodium acetate, potassium acetate, sodium formate, or a mixture thereof.

The 8-hydroxyquinoline comprises methyl 8-hydroxyquinoline.

The pyrosulfate ions are provided by sodium pyrosulfate, potassium pyrosulfate, ammonium pyrosulfate, or a mixture thereof.

Example 1

A waterproofing agent for concrete comprises 29 parts by weight of ammonium ferric sulfate, 3.6 parts by weight of glacial acetic acid, 4.4 parts by weight of 8-hydroxyquinoline, and 24 parts by weight of sodium pyrosulfate.

Example 2

A waterproofing agent for concrete comprises 9.7 parts by weight of ammonium ferric sulfate, 1.2 parts by weight of glacial acetic acid, 1.4 parts by weight of 8-hydroxyquinoline, and 8 parts by weight of sodium pyrosulfate.

Example 3

A waterproofing agent for concrete comprises 9.8 parts by weight of ferric chloride, 3.6 parts by weight of glacial acetic acid, and 4.4 parts by weight of 8-hydroxyquinoline.

Example 4

A waterproofing agent for concrete comprises 12 parts by weight of ferric sulfate, 3.6 parts by weight of glacial acetic acid, 4.4 parts by weight of 8-hydroxyquinoline, and 24 parts by weight of sodium pyrosulfate.

In the formations process of the concrete, the changes of the pH value and concentrations of cement aqueous solutions are recorded as indicating parameters to start of the complex reactions process to form $Fe(OH)_3$ colloids. Thus, the micro-cracks of the concrete can be filled synchronously in the formations process of the concrete.

Due to the nucleus inductions of the edges of the hydrated particles of the cement in the gaps of the concrete, the colloids can be exactly formed in the gaps, blocking the permeations and migrations of water molecules and other erosive substances.

The raw materials of the waterproofing agent are easily available, environmentally friendly, non-toxic or low toxic, and is easy to transport and store. The productions process only requires a simple meter, mixing equipment and storage tank. No waste gas, waste water, heat generations are produced. In general, the weight proportions of the iron ions to cement material is $1/1000$-$5/1000$. Specifically, ammonium ferric sulfate, glacial acetic acid, 8-hydroxyquinoline, and sodium pyrosulfate are mixed in the water, stirred, and completely dissolved. When making concrete, add the mixture as needed. The above four materials can also be mixed with a water reducing agent prior to added to the concrete. The curing conditions of the concrete mixed with the waterproof agent of the disclosure are the same as that of the ordinary concrete. Generally, the iron hydroxide colloid completely generates and blocks the tiny cracks of the concrete in 28-180 days, greatly reducing the penetrations and migrations speed of water, chloride ions, carbon dioxide, etc. in the concrete, with a reduction degree of $1/10$-$1/100$. The service life of the concrete structure using the waterproof agent of the disclosure can be greatly prolonged.

It will be obvious to those skilled in the art that changes and modifications may be made, and therefore, the aim in the appended claims is to cover all such changes and modifications.

What is claimed is:

1. A composition of matter, comprising:
   1) 1-60 parts by weight of ferric ions;
   2) 1-60 parts by weight of carboxylate ions;
   3) 1-40 parts by weight of 8-hydroxyquinoline; and
   4) 1-50 parts by weight of pyrosulfate ions.

2. The composition of claim 1, wherein the ferric ions are provided by ferric chloride, ammonium ferric sulfate, ferric sulfate, polyferric sulfate, ferric nitrate, or a mixture thereof.

3. The composition of claim 1, wherein the carboxylate ions are provided by glacial acetic acid, sodium acetate, potassium acetate, sodium formate, or a mixture thereof.

4. The composition of claim 1, wherein the 8-hydroxyquinoline comprises methyl 8-hydroxyquinoline.

5. The composition of claim 1, wherein the pyrosulfate ions are provided by sodium pyrosulfate, potassium pyrosulfate, ammonium pyrosulfate, or a mixture thereof.

6. The composition of claim 1, comprising: 1-60 parts by weight of ammonium ferric sulfate; 1-30 parts by weight of glacial acetic acid; 1-40 parts by weight of 8-hydroxyquinoline; and 1-50 parts by weight of sodium pyrosulfate.

* * * * *